United States Patent
Cabrera et al.

(10) Patent No.: US 6,708,227 B1
(45) Date of Patent: Mar. 16, 2004

(54) METHOD AND SYSTEM FOR PROVIDING COMMON COORDINATION AND ADMINISTRATION OF MULTIPLE SNAPSHOT PROVIDERS

(75) Inventors: Luis Felipe Cabrera, Bellevue, WA (US); Paul Oltean, Redmond, WA (US); David P. Golds, Redmond, WA (US); Stefan R. Steiner, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/556,533

(22) Filed: Apr. 24, 2000

(51) Int. Cl.[7] .............................. G06F 9/00; G06F 9/46
(52) U.S. Cl. ..................... 709/328; 709/317; 709/202; 709/226; 709/104
(58) Field of Search ................................ 709/328, 331, 709/332, 310, 223–226, 229, 201–203, 104; 711/161, 162

(56) References Cited

U.S. PATENT DOCUMENTS

| | | | | |
|---|---|---|---|---|
| 5,381,403 A | * | 1/1995 | Maher et al. ................ 370/254 |
| 5,495,607 A | * | 2/1996 | Pisello et al. ................. 707/10 |
| 5,678,042 A | * | 10/1997 | Pisello et al. ................. 714/47 |
| 5,754,782 A | * | 5/1998 | Masada ....................... 709/213 |
| 5,790,773 A | * | 8/1998 | DeKoning et al. ............. 714/6 |
| 5,835,953 A | | 11/1998 | Ohran ........................ 711/162 |
| 5,875,478 A | * | 2/1999 | Blumenau ................... 711/162 |
| 6,003,044 A | * | 12/1999 | Pongracz et al. ........... 707/204 |
| 6,105,030 A | * | 8/2000 | Syed et al. .................... 707/10 |
| 6,212,531 B1 | * | 4/2001 | Blea et al. .................. 707/204 |
| 6,366,987 B1 | * | 4/2002 | Tzelnic et al. ............... 711/162 |
| 6,393,537 B1 | * | 5/2002 | Kern et al. .................. 711/162 |
| 6,397,229 B1 | * | 5/2002 | Menon et al. .............. 707/204 |
| 6,473,775 B1 | * | 10/2002 | Kusters et al. .............. 707/200 |
| 6,505,216 B1 | * | 1/2003 | Schutzman et al. ......... 707/204 |

OTHER PUBLICATIONS

OpenGroup. "Systems Management Backup Services API" Apr. 1998.*
IBM. "ADSTAR Distributed Storage Manager". Oct. 1997.*
Jacobs, D.C., IBM ® Technical Disclosure Bulletin, "Get Database Server Application Information for the OS/2 Database Manager," 1991, 34(3), 113–114.

* cited by examiner

Primary Examiner—John Follansbee
Assistant Examiner—Lewis A. Bullock, Jr.
(74) Attorney, Agent, or Firm—Woodcock Washburn LLP

(57) ABSTRACT

A service specified by an application programming interface (API) acts as a coordinator/manager of different volume snapshot providers and an administrator of snapshot providers. The API acts to standardize protocols used in connection with different snapshot providers. An Interface Volume Snapshot Service Coordinator (VSSC) with appropriate API calls is provided, which is used to coordinate and administer multiple snapshot providers as well as maintain other snapshot information. The VSSC achieves this coordination and administration whether or not the snapshot providers are hardware-based, software-based or based in a combination of different underlying technologies. The VSSC thus performs coordination and administration operations, in addition to other operations relating to snapshot providers.

29 Claims, 8 Drawing Sheets

*PRIOR ART*

PRIOR ART

METHOD AND SYSTEM FOR PROVIDING COMMON COORDINATION AND ADMINISTRATION OF MULTIPLE SNAPSHOT PROVIDERS

BACKGROUND OF THE INVENTION

1. Field of the Invention

The present invention relates to volume snapshots in a computer system. More particularly, the present invention relates to a method and system for coordinating and administrating diverse, but similar elements in a computer system, and even more particularly, to a method and system for coordinating and administrating a plurality of snapshot providers.

2. Brief Description of Prior Developments

When a computer system crashes or the system freezes, many consequences ranging from the trivial to the irreparable may result. For standalone computers or client computers, a local system crash can result in the loss of work product. For example, anything that has not been saved properly may be lost from further access or use. Furthermore, a user may be inconvenienced by having to reboot the computer system, thereby expending additional time. In the case of network servers and other computer systems, a system crash can be even more sweeping, affecting multiple users, clients, and/or customers. As computer systems grow ever more complex, it seems that programmers, collectively speaking, have not been able to entirely eliminate system states in which a computer or application "freezes" or "crashes."

Accepting it to be true that the probability of a system crash or freeze is not zero, a field of study, known as recovery, has arisen which relates to improving the process whereby a computer system recovers from a crashed state to a stable state. Recovery from system instability has been the subject of much research and development.

In general, the goal of reboot or redo recovery is, after a crash, to return the computer system to a previous and presumed correct state in which the computer system was operating immediately prior to the crash or at a point in time for which a consistent set of backup information is known. Because point in time information representative of a consistent state for all of an application's dependencies can not be ensured, some restore or backup services may incorrectly reset an application's state to an incorrect state, or alternatively, an extremely resource intensive brute force freeze or flush of every process of the computer system may be required in order to recover to a stable state for the application, volume or other object being backed up or restored.

For example, database system designers have attempted to design database recovery techniques which minimize the amount of data lost, the amount of work needed to recover to the pre-crash operating state, and the performance impact of recovery on the database system during normal operation. A known difficulty encountered with recovering target data object(s) is that there may exist various dependencies associated with a target object that can prevent a consistent point in time copy of the target data. For example, the occurrence of file save operations, registry write operations, database storage operations, active directory write operations, access operations, authentication operations and/or other like dependencies might exist prior to the initiation of a restore or backup service, and prevent atomic point in time recovery or backup of target data. While a full backup of crashed computer system volume(s) may be performed for an atomic point in time, it is a resource intensive process, in terms of both time, memory and processing, and is to be avoided if possible.

In response to difficulties associated with existing backup techniques, a type of efficient backup technique has been developed that utilizes a snapshot provider for providing snapshot services to target object(s) or volume(s). As an alternative to a full backup, a volume snapshot is also a consistent, point in time copy of a volume. However, instead of implementing a brute force file by file recovery of a volume any time the system crashes, a snapshot enables the state of a computer system to be frozen at an arbitrary point in time, which enables a much faster and less resource intensive backup process. In general, a snapshot is created at a time $t_0$. After $t_0$, the content of the snapshot itself can be backed-up to an off-line target, and a full backup is thus avoided through the use of differential files, which enable the system to act only upon that which has changed since a previous time. A backup application may use snapshot services, but many different types of services other than backup services may also use snapshot services. Any source or service that might desire a consistent point in time view of a data set is a good candidate for the use of snapshot service providers.

To maintain the snapshot data, when a change is written to an allocation unit (e.g., a cluster) that was in use at the time of the snapshot, the original data is copied from the allocation unit to the differential file before writing the new data. This method is often referred to as "copy-on-write." In this way, the state i.e., snapshot of the base volume at the time the snapshot was taken, is accessible by reading current data from the base volume in conjunction with any data stored in the differential file associated with the snapshot.

"Support for Multiple Temporal Snapshots of Same Volume", U.S. patent application Ser. No. 09/505,447, filed FEb. 16, 2000, to Cabrera et al., "Kernel-Based Crash-Consistency Coordinator", U.S. patent application Ser. No. 09/505,344, filed Feb. 16, 2000, to Golds et al. and "System and Method for Growing Differential File on a Base Volume of a Snapshot", U.S. patent application Ser. No. 09/505,450, filed Feb. 16, 2000, to Kusters et al. relate to backup processes generally and are directed to different aspects of snapshot systems. These applications are hereby incorporated by reference, as background information relating to the provision of snapshot services.

Thus, a snapshot is a logical copy of the information stored on a volume representative of a particular instant in time. A snapshot may be used like a backup copy of a volume, but is much faster to create than a full backup. A "base volume" is the volume that is represented by the snapshot. A snapshot system uses a differential file to track the changes written to the base volume after the snapshot is captured. If multiple snapshots are taken over time, a differential file exists for each snapshot.

In systems having multiple volumes, data or files may be distributed across more than one volume. Some programs may maintain large data files on one volume and log files on another volume. Many of those programs include the capability to recover the data and log files in the event of a system crash, but only if the crash occurred simultaneously across all affected volumes. However, existing snapshot systems do not have the ability to coordinate snapshot sets across multiple volumes. Thus, current crash recovery software and the like can not reliably reconstruct related files distributed across those multiple volumes.

Additionally, a developer presently has to choose among multiple snapshot providers or write code that accommodates different types of snapshot providers. Some snapshot providers, e.g., implement what are known as split-mirror snapshots, while others implement differential snapshots. Thus, there is no standard or uniform protocol for making calls to or otherwise communicating with a plurality of snapshot providers from an application or other object. Furthermore, since different volumes may use different snapshot providers, there is currently a difficulty in collectively storing snapshot information about volume(s) that are serviced by different snapshot providers.

To provide more insight into the problem, there are multiple companies that have developed different snapshot services, with various compatibility and interchangeability issues. EMC, for example, is a provider of a hardware-based solution that utilizes a technique known as the "split-mirror" technique. On the other hand, there are also companies that provide software-based solutions. Some companies provide file-based solutions while still others provide volume-based solutions. Furthermore, there are some companies that provide snapshot services that utilize a combination of hardware and software-based snapshot services. Currently, there are at least fourteen different companies offering different snapshot solutions. In a lot of cases, the protocol for respective snapshot service modules varies considerably. For example, the format for calls for snapshot services, for the delivery of snapshot sets and for other communications such as error messaging may vary greatly from one snapshot service provider to another snapshot service provider. An efficient mechanism for coordinating snapshots across multiple volumes and multiple providers using a standardized protocol has thus eluded those skilled in the art.

Consequently, it would be desirable to provide a mechanism or object that coordinates and administers a plurality of volume snapshot providers. It would be further advantageous to provide a mechanism that standardizes the protocol used to communicate among a plurality of different snapshot providers.

SUMMARY OF THE INVENTION

The present invention relates generally to computer systems that employ snapshot services e.g., to aid in efficient backup, restore or recovery processes, and generally to maintain information about target object(s) or volume(s) from the standpoint of a consistent, atomic point in time. The present invention provides a service specified by an application programming interface (API) that acts as a coordinator/manager of different volume snapshot providers and an administrator of snapshot providers. The API acts to standardize protocols used in connection with different snapshot providers. Thus, in accordance with the present invention, an Interface Volume Snapshot Service Coordinator (VSSC) with appropriate API calls is provided, which is used to coordinate and administer multiple snapshot providers as well as maintain other snapshot information. The VSSC achieves this coordination and administration whether or not the snapshot providers are hardware-based, software-based or based in a combination of different underlying technologies. The VSSC thus performs coordination and administration operations, in addition to other operations relating to snapshot providers.

Other features of the present invention are described below.

BRIEF DESCRIPTION OF THE DRAWINGS

The system and method for providing common coordination and administration of multiple snapshot providers is further described with reference to the accompanying drawings in which.

DETAILED DESCRIPTION OF PREFERRED EMBODIMENTS

Figure 1:
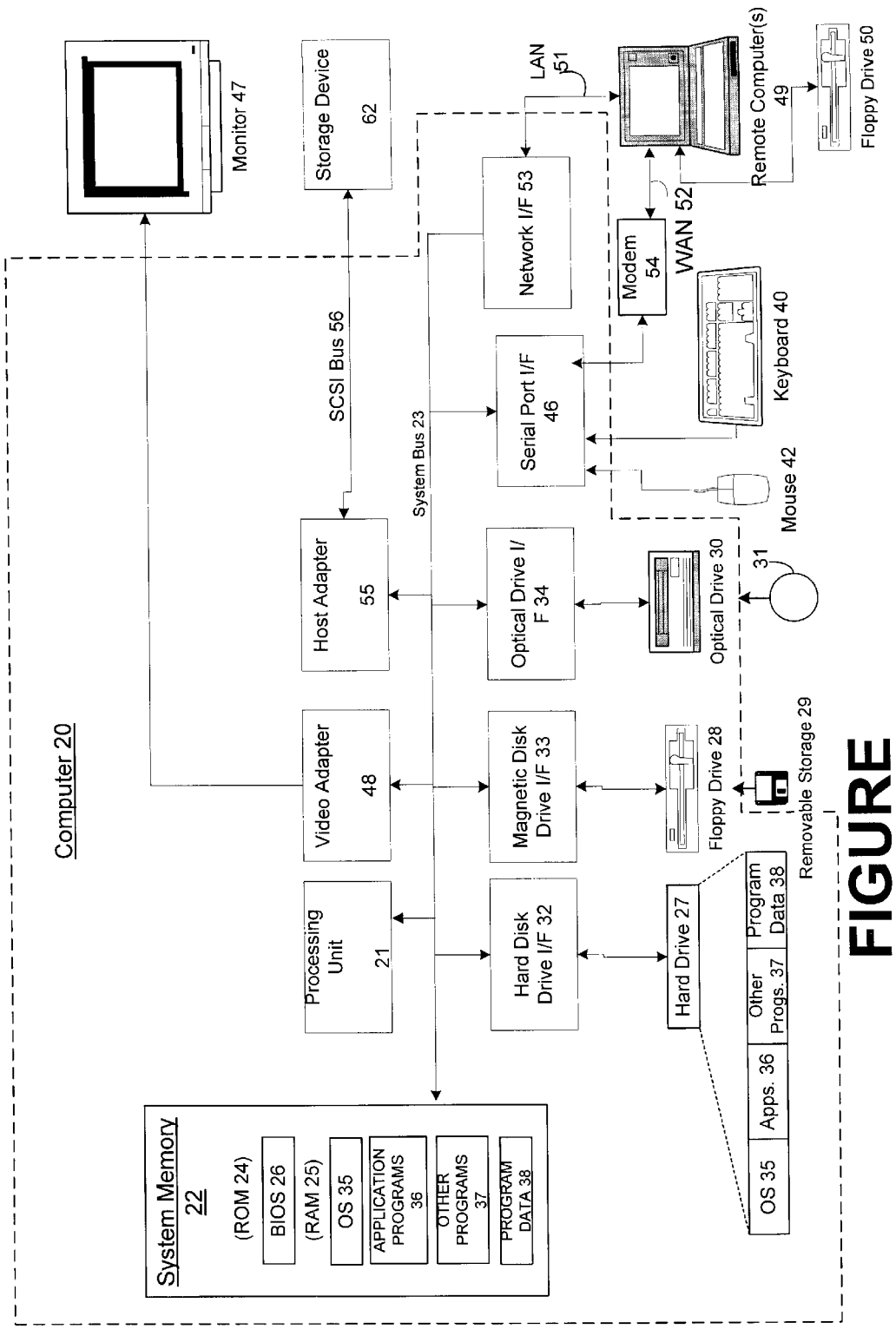
FIG. 1 is a block diagram representing a general purpose computer in which aspects of the present invention may be incorporated.

This invention relates generally to computer systems that employ snapshot services e.g., to aid in efficient backup, restore or recovery processes. The present invention provides a service specified by an application programming interface (API) that acts as a coordinator/manager of different volume snapshot providers and an administrator of snapshot providers. The API acts to standardize protocols used in connection with different snapshot providers. Thus, in accordance with the present invention, an interface Volume Snapshot Service Coordinator (VSSC) with appropriate API calls is provided, which is used to coordinate and administer multiple snapshot providers as well as maintain other snapshot information. The VSSC achieves this coordination and administration whether or not the snapshot providers are hardware-based, software-based or based in a combination of different underlying technologies. The VSSC thus performs coordination and administration operations, in addition to other operations relating to snapshot providers.

As to coordination, the VSSC operates to create snapshots, delete snapshots, query the list of snapshots, query a snapshot set, query and communicate with volumes for snapshot purposes, and otherwise handle and process information specific to different snapshot providers in a way that achieves a standard communication protocol between applications and the VSSC. Thus, a protocol is implemented for the VSSC that is independent of varying snapshot provider protocols. A snapshot set can thus contain snapshots from different providers, and snapshot generation is coordinated among different snapshot providers.

The coordination operations preferably manage a full range of activity. For example, the coordinator application programming interface (API) can create snapshots by performing such acts as initiating a snapshot set, adding to a pre-existing snapshot set, and causing the snapshot sets to be taken. The coordinator may also perform querying tasks, snapshot deletion, snapshot retrieval, obtaining extension(s) and other communications relevant to coordinating the process between multiple snapshot providers and applications that make calls thereto.

As to administration, the VSSC also operates to register and un-register snapshot providers from the management of the VSSC. For example, in consideration of a particular computer system which only uses software snapshot providers, the present invention advantageously either does not register at initialization or later can un-register any hardware snapshot providers. The registration state is maintained by the VSSC on a per machine/domain basis, while volumes may be found anywhere (locally or remotely). Meta-data specific to particular snapshot providers is contained in snapshots metadata, and is handled and processed by the VSSC of the present invention.

As to operations relating to snapshot providers other than coordination and administration, the VSSC includes, for instance, the maintenance of application dependency information, and the like.

The VSSC thus has the ability to keep track of who has taken a volume snapshot of whom among different volume snapshot providers e.g., when a hardware volume snapshot provider takes a snapshot of a volume being serviced by a software volume snapshot provider (an example of a volume snapshot dependency). Furthermore, the VSSC has the ability to mix different types of snapshots both vertically and horizontally e.g., a mix of differential snapshots and plex snapshots (hardware, uses split-mirror method). With respect to the prepare phase of a snapshot, the VSSC generates and utilizes snapshot provider dependent information to communicate with different snapshot providers to prepare each snapshot provider. The VSSC also separates the prepare and commit phases of snapshot generation for synchronization purposes e.g., in order to allow mixing of differential snapshots with split-mirror snapshots, and other snapshots having differing timing.

A snapshot provider (SP) in accordance with the present invention performs a variety of operations. An SP prepares a volume for a snapshot, pre-commits a volume for snapshot, commits a volume to a snapshot and post-commits a volume snapshot. These operations relate generally to the creation of a snapshot. An SP can also perform queries of volumes, delete snapshots, retrieve snapshots, get extensions and perform other communications, such as bypassing the VSSC of the present invention.

Thus, advantageously, the present invention provides management of multiple and different snapshot providers while handling the administrative tasks incident to registering and unregistering different types of snapshot providers to or from the framework of the management. Furthermore, the invention also takes advantage of other benefits of central administration, such as common error condition communications and re-try protocol in the event of a failure, for two examples. Ordinarily, different snapshot providers output different types of error information, or the error information is output in different formats. Also, different snapshot providers have different protocol for a snapshot re-try in the event of a snapshot attempt failure. The present invention provides a solution to these non-uniform communication problems, and is thus able to standardize protocols for types of communications that are snapshot provider dependent.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port, game port, or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN. 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
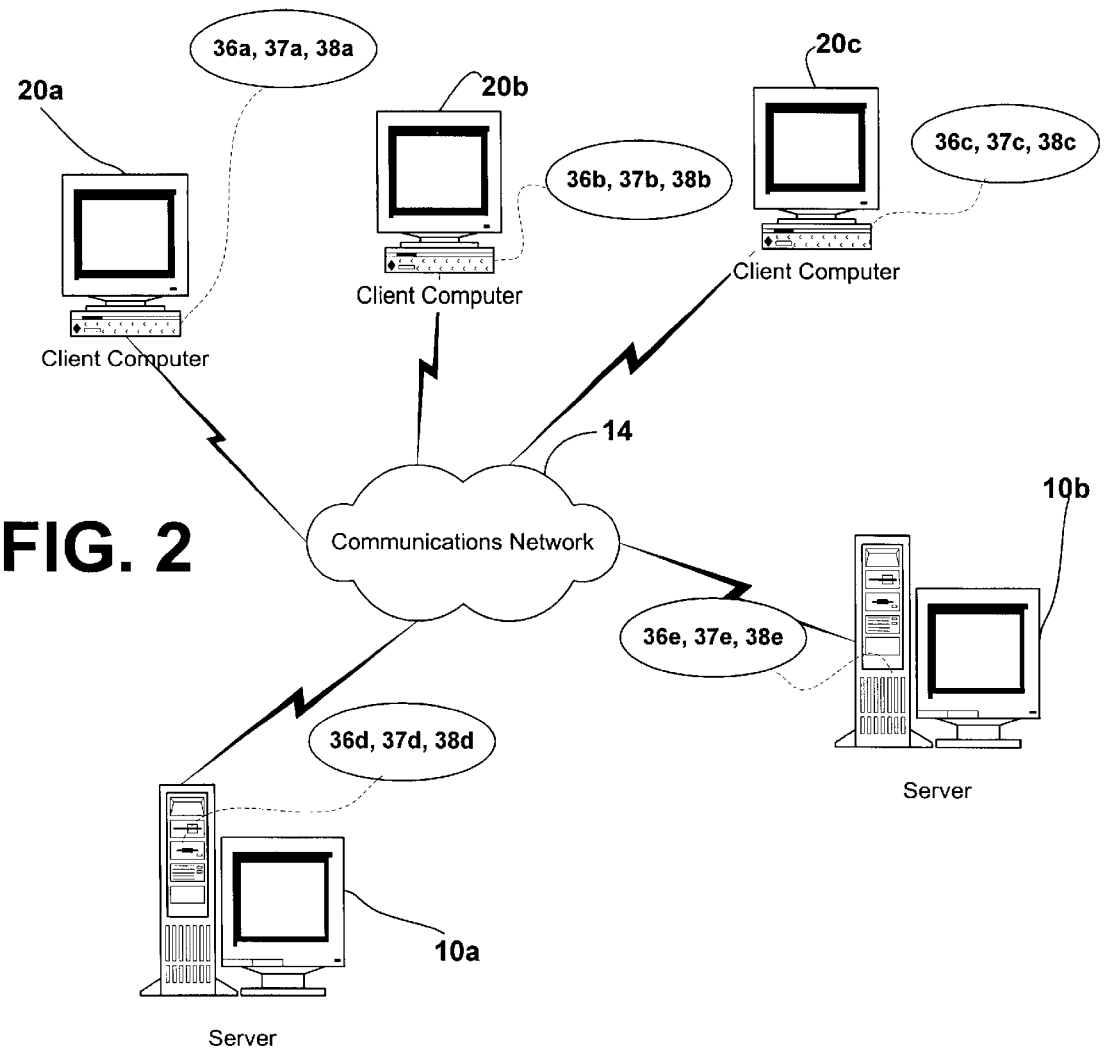
FIG. 2 is a block diagram representing an exemplary network environment with a server in connection with which the method and apparatus of the present invention may be implemented.

It should be noted that the computer described above can be deployed as part of a computer network, and that the present invention pertains to any computer system having any number of memory or storage units, and any number of applications and processes occurring across any number of volumes. Thus, the present invention may apply to both server computers and client computers deployed in a network environment, having remote or local storage. FIG. 2 illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client computers 20a, 20b, 20c, etc. In a network environment in which the communications network 14 is the Internet, for example, the servers 10 can be Web servers with which the clients 20 communicate via any of a number of known protocols such as hypertext transfer protocol (HTTP).

Each client computer 20 and server computer 10 may be equipped with various application program modules 36, other program modules 37 and program data 38, and with connections or access to various types of storage elements or objects. Thus, each computer 10 or 20 may have software with the VSSC of the present invention loaded or installed thereon or downloaded thereto. It should be understood that any communications among backup services, the VSSC, snapshot service providers and data storage in accordance with the present invention may take place across volumes (intervolume), within the same volume (intravolume), or remotely or locally via a network. The term volume is often used as a synonym for the storage medium itself, but it is possible for a single disk to contain more than one volume or for a volume to span more than one disk.

Thus, the present invention can be utilized in a computer network environment having client computers for accessing and interacting with the network and a server computer for interacting with client computers. As mentioned previously, in accordance with the present invention, an API protocol is used in connection with communications among the VSSC, backup services and snapshot service providers. This API can be implemented with a variety of network or system architectures, and thus should not be limited to the example shown and described.

Figure 3A:
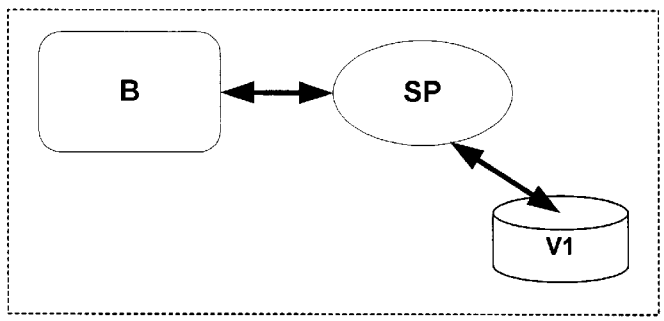
FIGS. 3A and 3B are illustrations of a prior art software technique for providing snapshot services.
Figure 3B:
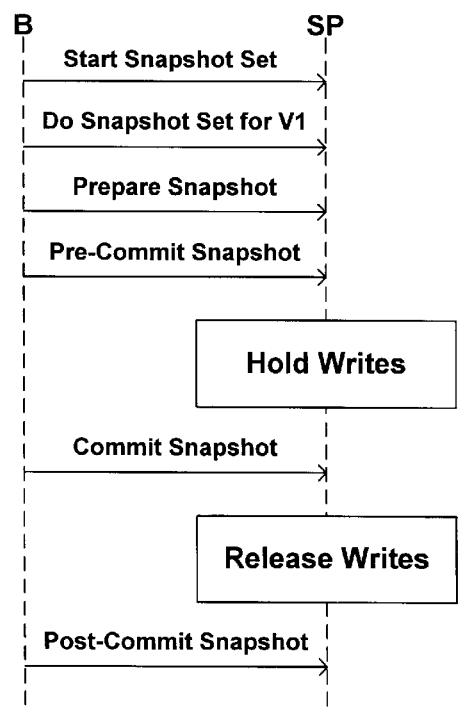

FIGS. 3A and 3B illustrate a prior art software technique for providing snapshot services. A backup service B communicates with a snapshot service provider SP that can take a snapshot of a volume V1 or other target object(s). An exemplary software sequence is illustrated below the dashed rectangle, representing a prior art software snapshot technique; however, it should be understood that any one of a hardware or software snapshot providers might be represented by snapshot provider SP. Additionally, any one snapshot service may make use of multiple snapshot service providers. For example, an exemplary hardware snapshot technique is known as the split-mirror technique, and may be invariably be used as a standalone technique or in connection with other hardware or software techniques. Thus, a snapshot set is initiated, and a request for a snapshot of volume V1 is requested. In short detail, a snapshot is subsequently prepared and pre-committed before all write enables are frozen or turned off. The snapshot is committed, then writes are enabled again and the snapshot is post-committed.

Figure 4:
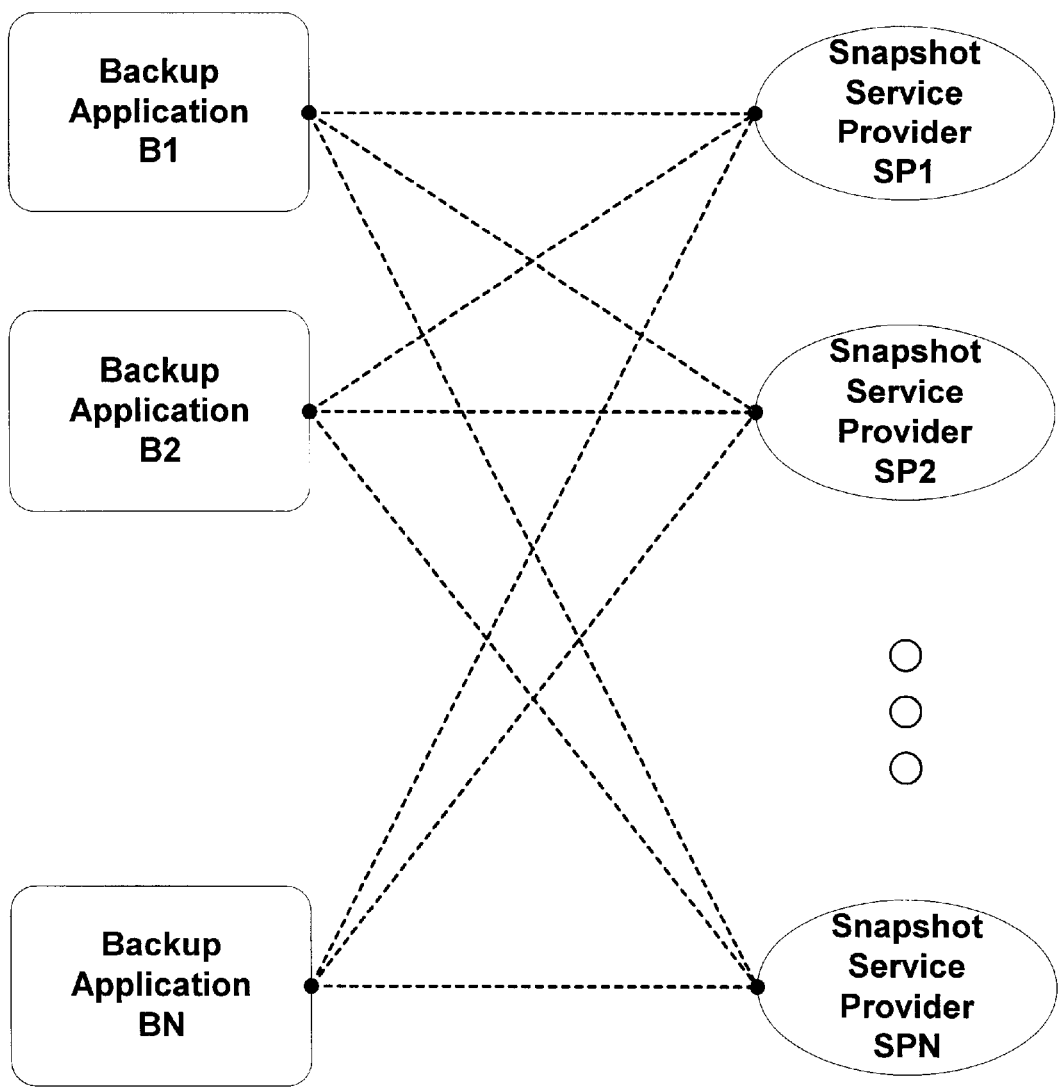
FIG. 4 is an illustration of a difficulty with present snapshot service solutions in a complex computer system.

FIG. 4 is an illustration of a difficulty with present snapshot service solutions in a complex computer system. While the technique of FIGS. 3A and 3B (or other types of snapshot techniques including hardware solutions). When a backup service B must communicate with ever more and more snapshot service providers SP1 to SPN, the tasks associated with developing code that can achieve communications across all of the different types of providers are difficult and time-consuming. In addition, non-uniform protocol increases the chances that a developer will make a mistake when attempting to interface with any one of snapshot service providers SP1 through SPN. The problem is only compounded when multiple developers, and multiple backup services B1 to BN are contemplated. As the dashed lines make clear, the number of opportunities for communication errors increases significantly as a result of the proliferation of different types snapshot service providers with different protocols and the proliferation of services that may requires snapshot services. Consequently, it would be of great utility to simplify this process.

Figure 5:
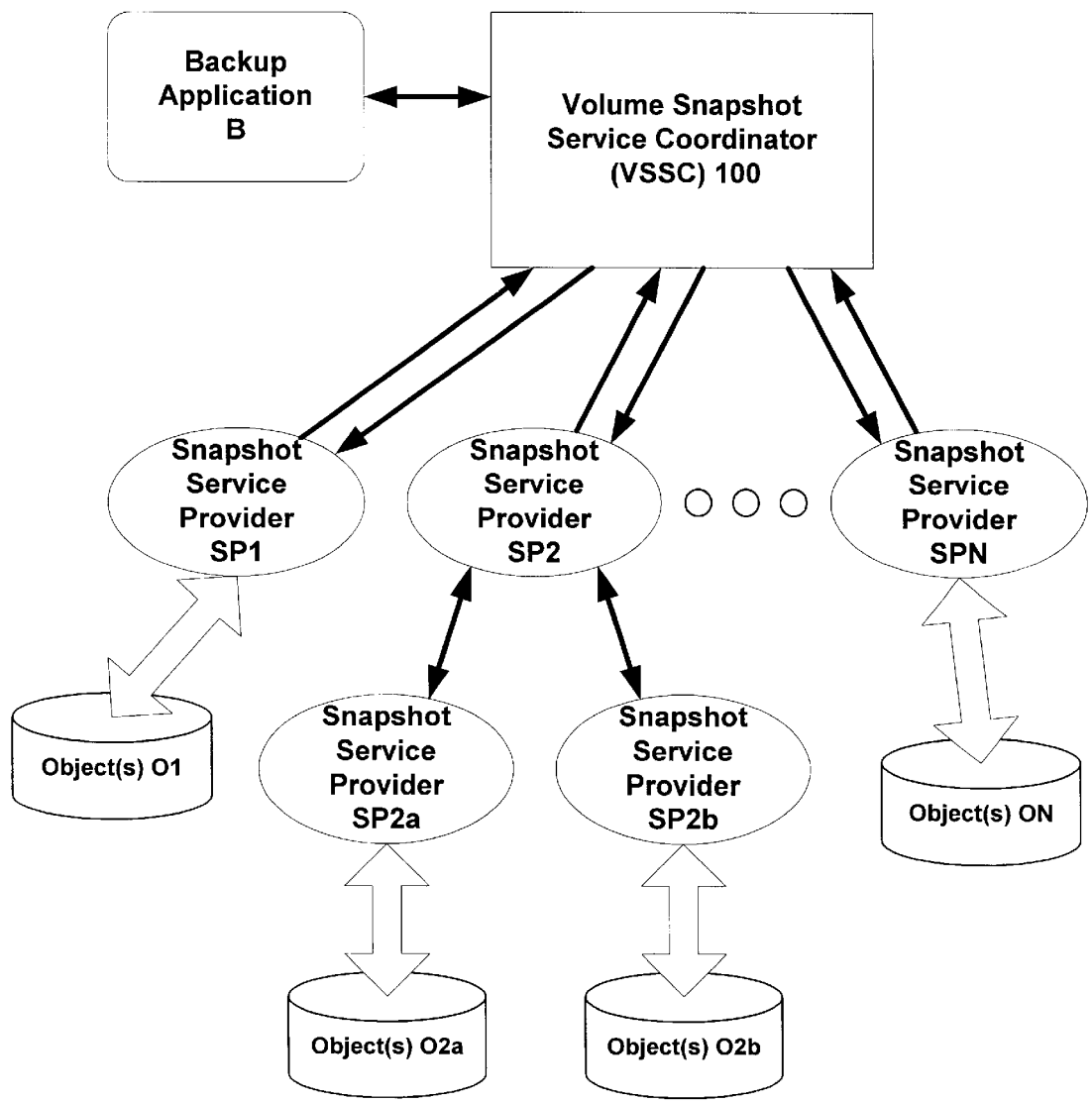
FIG. 5 is a block diagram of an exemplary snapshot service coordination and administration technique in accordance with the present invention.

FIG. 5 is a block diagram of an exemplary snapshot service coordination and administration technique in accordance with the present invention. Thus, an interface Volume Snapshot Service Coordinator (VSSC) 100 is provided for standardizing, coordinating and administrating communications between a backup application B and a plurality of snapshot service providers SP1 to SPN. As mentioned, any one snapshot service provider may also make use of other snapshot solutions e.g., SP2a and SP2b. Each snapshot service SP1 to SPN operates to take a snapshot of target object(s) O1 to ON, which could, e.g., be volume(s). Thus, as the figure makes shows, the VSSC 100 application interface enables standardized communication between a backup application B and multiple types of snapshot services SP1 to SPN. VSSC 100 knows how to communicate with each of the different snapshot service providers SP1 to SPN, so that standard protocol for calling snapshot services from a backup application or any service utilizing consistent point in time information is achieved.

Figure 6:
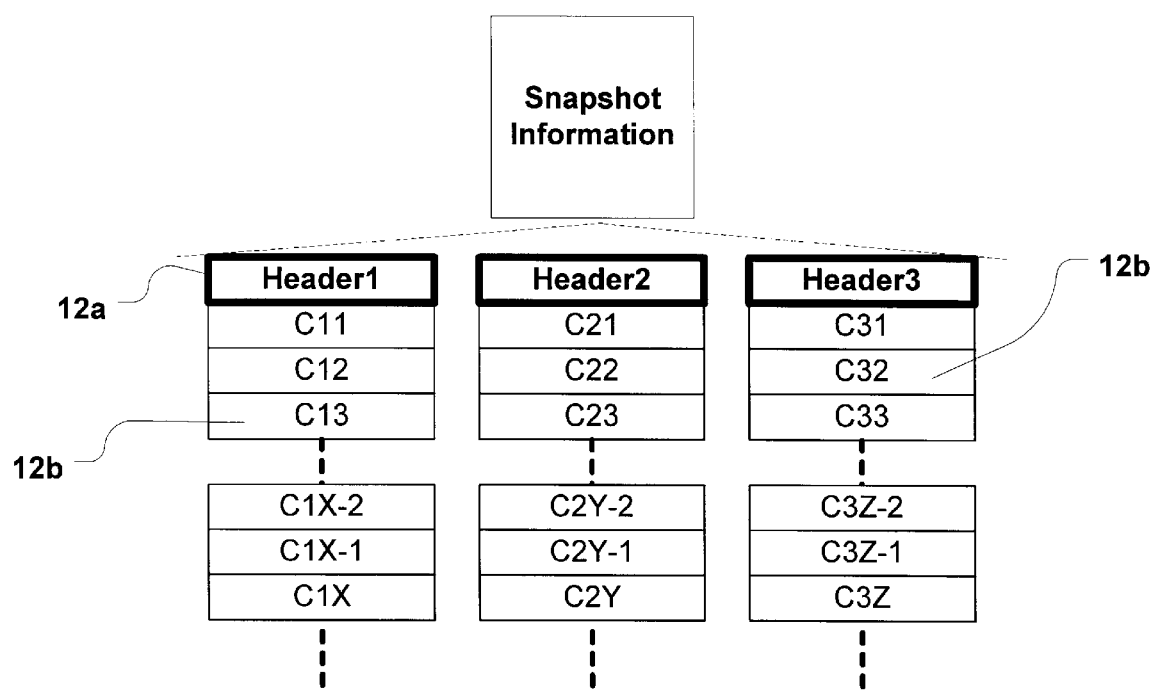
FIG. 6 is an exemplary data representation for data relating to a snapshot set in accordance with the present invention.

Preferably, identification information about each snapshot set is stored for use in connection with the snapshot set. Such identification information could include a snapshot set ID, one or more of snapshot service provider IDs, a time stamp, and other like information. An exemplary storage of snapshot information is depicted in FIG. 6, however, it will be appreciated that any format or data structure for the storage of snapshot set identification information is suitable to the purposes of the present invention. For example, a snapshot set might include a header 12a, and any other characteristics 12b that may relate to snapshot set that would be useful for sorting, searching, accessing or otherwise utilizing a snapshot set. Preferably, this identification information 12b includes at least a snapshot set ID, individual snapshot IDs contained in the snapshot set and the time to which the snapshot set relates. Snapshot IDs, for example, permit singular communications to, from or pertaining to a single snapshot service provider SP.

Figure 7A:
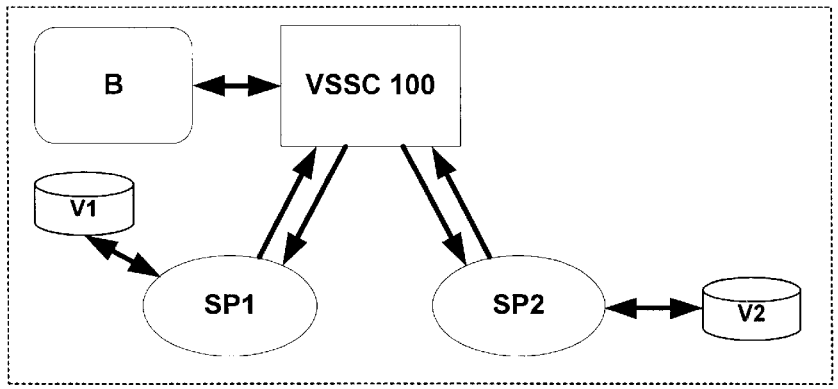
FIGS. 7A and 7B are block and flow diagrams of an exemplary snapshot service coordination and administration technique in accordance with the present invention.
Figure 7B:
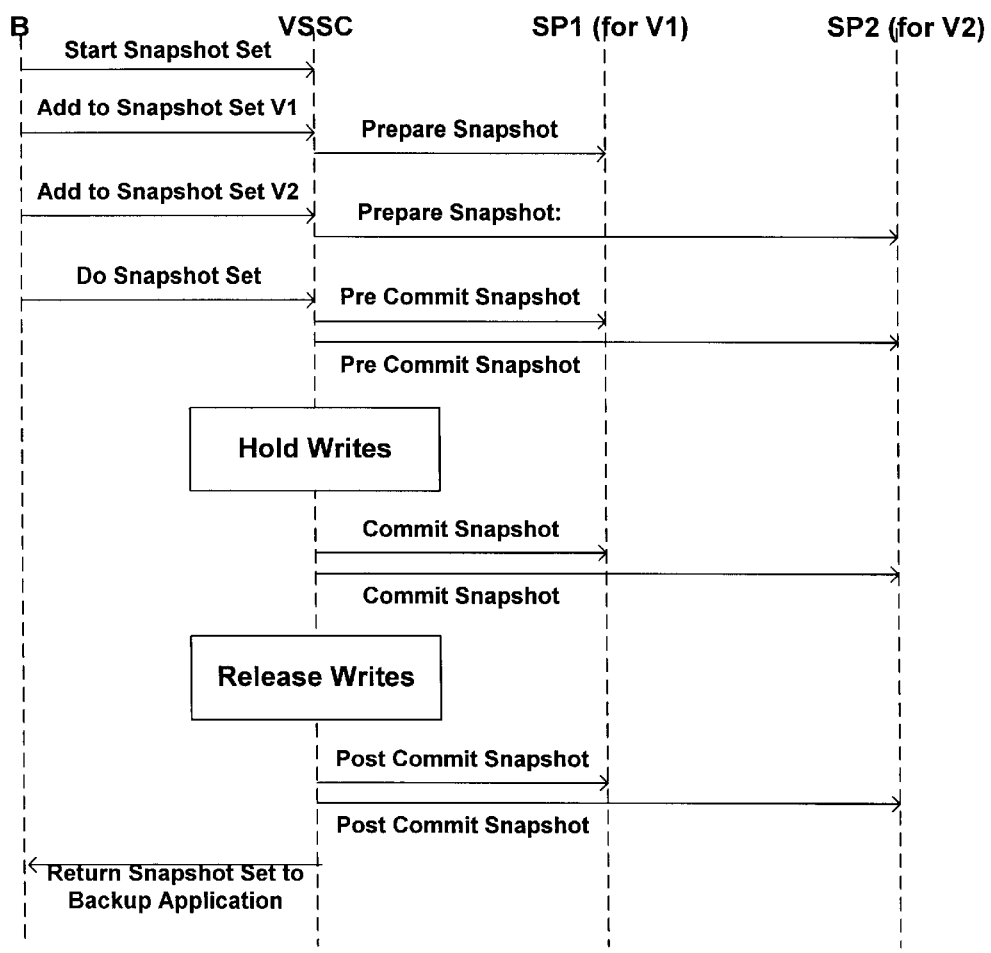

FIGS. 7A and 7B are block and flow diagrams of an exemplary snapshot service coordination and administration technique in accordance with the present invention. A backup application B (ir any service utilizing snapshot services) communicates a request for snapshot services from the VSSC 100 of the present invention. In the present example, this request made for the two volumes V1 and V2, which have snapshot service providers SP1 and SP2, respectively, for the provision of snapshot services. VSSC 100 may consist of a plurality of modules, one of which may determine which snapshot service provider to use to complete the snapshot. While the example is shown with respect to two snapshot service providers SP1 and SP2, the present description applies more generally to any number and combinations of different snapshot providers. Thus the VSSC 100 makes a request to SP1 for a snapshot of volume V1, and a request to SP2 for a snapshot of volume V2, and advantageously, the backup application B did not have to have any information about which snapshot service provider among many would perform the task. The VSSC 100 has information regarding which snapshot service providers are assigned to which target object(s). Then, the respective snapshots are taken, the respective snapshots are returned to the VSSC 100. Then, a snapshot set for volumes V1 and V2 along with snapshot set identification information is compiled and returned to the backup application B by the VSSC. Advantageously, the backup application could be blind to which type of snapshot service provider(s) was taking the snapshot. Further advantages include standardization of error messaging, and other efficiencies gained from a common interface.

Thus, first a request is made to start a snapshot set pertaining to volumes V1 and V2. A snapshot set is a combination of volumes for which snapshots for a particular point in time are desired, so that all of the snapshots in the snapshot set relate to that point in time. The backup application makes a request to the VSSC 100 to add V1 to a snapshot set, according to the standard protocol provided by the API. The VSSC 100 then communicates with SP1 to prepare for a snapshot of V1. Then the backup application makes a request to the VSSC 100 to add V2 to a snapshot set. The VSSC 100 then communicates with SP1 to prepare for a snapshot of V2. Then, a request is made for the entire snapshot set for an atomic point in time. Next, the snapshots for V1 and V2 are pre committed. Then, all writes are disabled to V1 and V2 for the committing of the snapshots, and re-enabled for a post committing of the respective volumes. This way the data is frozen or unchanged during the core of the snapshot process, so that all volumes in the resultant snapshot set relate to a single point in time. Lastly, the snapshot set is returned to the backup application B along with snapshot set identification information, as previously described.

As mentioned, VSSC 100 may comprise various modules in accordance with the present invention. For example, a coordinator object for creating snapshots could include one or more of the following capabilities: start a snapshot set, add to a snapshot set, perform a snapshot set, query, delete a snapshot, get a snapshot, get an extension and the like. An administrator object could perform, for example, the registering of snapshot providers into the infrastructure of the present invention, unregistering snapshot providers, querying providers for various information and the like.

Also, as described previously, the number of different types of snapshot providers is proliferating rapidly; however, yet another snapshot provider could be provided as a module in connection with the software of the present invention. This provider object typically includes the ability to prepare, pre commit, commit and post commit snapshots, querying capabilities, and the ability to delete snapshots, get snapshots and get extensions.

Figure 8:
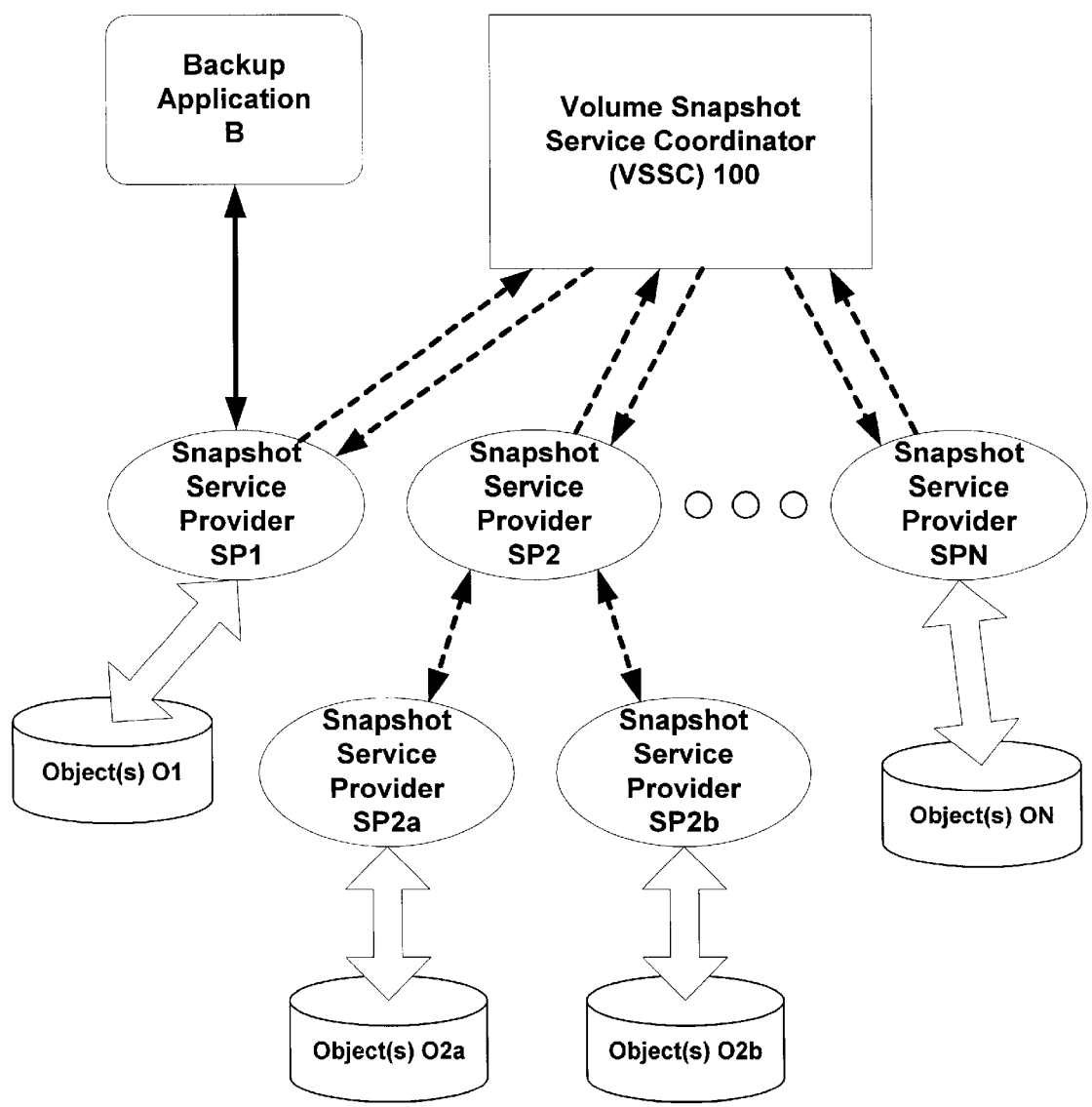
FIG. 8 shows an exemplary bypass of the VSSC 100 in accordance with the present invention.

Furthermore, VSSC 100 includes mechanism so that the architecture of the present invention may be bypassed. FIG. 8 shows an exemplary bypass of the VSSC 100 in accordance with the present invention. Essentially, a request can be made directly to a snapshot provider SP1 to simplify the process e.g., when multiple providers SP1 to SPN are not necessary.

The various techniques described herein may be implemented with hardware or software, where appropriate, or with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/ or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques and snapshot techniques of the present invention may invariably be a combination of hardware and software to be utilized in connection with storing data or taking snapshots of data, respectively.

While the present invention has been described in connection with the preferred embodiments of the various figures, it is to be understood that other similar embodiments may be used or modifications and additions may be made to the described embodiment for performing the same function of the present invention without deviating therefrom. For example, while in a preferred embodiment, the VSSC is treated as a single object, the VSSC may comprise various objects including a coordinator and an administrator, and any other tasks germane to the management of snapshot providers. Furthermore, it should be emphasized that a variety of computer platforms, including handheld device operating systems and other application specific operating systems are contemplated. Therefore, the present invention should not be limited to any single embodiment, but rather construed in breadth and scope in accordance with the appended claims.

What is claimed is:

1. A computer system, comprising:
   plurality of snapshot providers;
   a service; and
   a volume snapshot service coordinator with communications according to an application programming interface (API),
   wherein said service requests a snapshot set, said volume snapshot service coordinator coordinates and administers the performance of said snapshot set by at least one of said plurality of snapshot providers and the delivery of said snapshot set to said service.

2. A system according to claim 1, wherein snapshot set identification information is associated with said snapshot set.

3. A system according to claim 2, wherein said snapshot set identification information includes a snapshot set ID and one or more of a snapshot service provider ID.

4. A system according to claim 2, wherein said snapshot set identification information is communicated to said service with said snapshot set.

5. A system according to claim 1, wherein said volume snapshot service coordinator standardizes error messaging communications between said service and said coordinator.

6. A system according to claim 1, wherein a snapshot provider of said plurality of snapshot providers is a software-based provider.

7. A system according to claim 1, wherein a snapshot provider of said plurality of snapshot providers is a hardware-based provider.

8. A system according to claim 1, wherein a snapshot provider of said plurality of snapshot providers is a snapshot provider that makes calls to and communicates with another snapshot provider.

9. A system according to claim 1, wherein said service is a backup service.

10. A method for standardizing communications between a service and a plurality of snapshot providers including the acts of:
    the service requesting a snapshot set according to a standard protocol;
    determining which of a plurality of snapshot providers will provide snapshots for the snapshot set;
    performing the snapshots with said snapshot providers determined according to said determining; and
    aggregating the performed snapshots to form said snapshot set.

11. A method according to claim 10, further comprising communicating said snapshot set to said service.

12. A method according to claim 10, further comprising determining snapshot set identification information for association with said snapshot set.

13. A method according to claim 12, further comprising communicating said snapshot set and snapshot set identification information to said service.

14. A method according to claim 10, further comprising storing said snapshot set and snapshot set identification information.

15. A method according to claim 10, further comprising communicating error messaging information to said service according to said standard protocol.

16. A method according to claim 10, wherein a coordinator object interfaces communications between said service to said plurality of snapshot providers.

17. A method according to claim 10, wherein communications between said service and a coordinator object are formatted according to an application programming interface.

18. A method according to claim 10, wherein said snapshot providers include a software-based provider.

19. A method according to claim 10, wherein said snapshot providers include a hardware-based provider.

20. A method according to claim 10, wherein said snapshot providers include a snapshot provider that makes calls to and communicates with another snapshot provider.

21. A method according to claim 10, wherein said service is a backup service.

22. A computer-readable medium having computer-executable instructions for instructing a computer to perform the acts recited in claim 10.

23. A memory for storing data for access in a computing system, comprising:
    a data structure for storing snapshot set identification information, the data structure comprising:
    an identifier identifying a snapshot set; and
    an identifier identifying a snapshot service provider among a plurality of snapshot service providers.

24. An application programming interface (API) for standardizing communications calls for a snapshot set including standardizing communications of snapshot set identification information stored in a data structure, as recited in claim 23.

25. An application programming interface (API) for use in a computer system, wherein said API protocol standardizes communications between a service and a plurality of snapshot service providers via a coordinator object.

26. An API according to claim 25, wherein said API standardizes coordination and administration of snapshots by a plurality of snapshot providers.

27. An API according to claim 25, wherein said API specifies a protocol for snapshot set identification information.

28. An API according to claim 27, wherein said snapshot set identification information includes a snapshot set ID and one or more of a snapshot service provider ID.

29. An API according to claim 25, wherein said API specifies a protocol for error messaging communications between said service and a coordinator object.

* * * * *